US012226851B2

(12) United States Patent
Donadello et al.

(10) Patent No.: US 12,226,851 B2
(45) Date of Patent: Feb. 18, 2025

(54) COMBINED OPTICAL SYSTEM FOR DIMENSIONAL AND THERMAL MEASUREMENTS, AND OPERATING METHOD THEREOF

(71) Applicant: ADIGE S.p.A., Levico Terme (IT)

(72) Inventors: Simone Donadello, Rodigo (IT); Barbara Previtali, Milan (IT)

(73) Assignee: ADIGE S.p.A., Levico Terme (IT)

(*) Notice: Subject to any disclaimer, the term of this patent is extended or adjusted under 35 U.S.C. 154(b) by 120 days.

(21) Appl. No.: 17/218,578

(22) Filed: Mar. 31, 2021

(65) Prior Publication Data

US 2021/0308792 A1 Oct. 7, 2021

(30) Foreign Application Priority Data

Apr. 1, 2020 (IT) .......................... 102020000006880

(51) Int. Cl.
*B23K 26/144* (2014.01)
*B23K 26/046* (2014.01)
(Continued)

(52) U.S. Cl.
CPC .......... *B23K 26/144* (2015.10); *B23K 26/046* (2013.01); *B23K 26/1462* (2015.10); *B23K 26/38* (2013.01)

(58) Field of Classification Search
CPC .. B23K 26/034; B23K 26/046; B23K 26/048; B23K 26/144; B23K 26/1462;
(Continued)

(56) References Cited

U.S. PATENT DOCUMENTS 5,545,896 A * 8/1996 Bratt .......................... G01J 5/02
250/353
10,471,542 B1 * 11/2019 Gradl ................. B23K 26/0884
(Continued)

FOREIGN PATENT DOCUMENTS

BE    1025565 A1    4/2019
EP    2388573 A2    11/2011

OTHER PUBLICATIONS

Search Report for IT 202000006880 dated Dec. 23, 2020.
(Continued)

*Primary Examiner* — Dana Ross
*Assistant Examiner* — Adam M Eckardt
(74) *Attorney, Agent, or Firm* — Ferguson Case Orr Paterson

(57) ABSTRACT

A combined optical system for determining temperature of the surface of an object or material and its distance with respect to a predetermined reference point associated with the system includes an optical radiation source emitting optical probe radiation at a predetermined wavelength or in a predetermined wavelength range, a source control unit controlling switching of the source from an operative condition, in which it emits optical probe radiation, to an inoperative condition, in which it does not emit optical probe radiation, optical detectors acquiring scattered optical radiation and thermally emitted optical radiation from the surface of the object or material, and a processing unit determining the distance of the surface of the object/material based on scattered optical probe radiation when the source is operative, and the local temperature of the surface of the object/material on the basis of thermally emitted optical radiation when the source is inoperative.

24 Claims, 9 Drawing Sheets

(51) Int. Cl.
  *B23K 26/14* (2014.01)
  *B23K 26/38* (2014.01)

(58) Field of Classification Search
  CPC ........ B23K 26/20; B23K 26/34; B23K 26/38;
       B23K 26/14; G01B 11/026; G01J 5/0003;
       G01J 5/0275; G01J 5/0803; G01J 5/0806;
       G01J 5/0846; G01J 5/60
  See application file for complete search history.

(56) References Cited

U.S. PATENT DOCUMENTS

| | | | | |
|---|---|---|---|---|
| 2016/0096236 | A1* | 4/2016 | Cho | B23K 26/032 219/76.12 |
| 2017/0266762 | A1* | 9/2017 | Dave | B33Y 10/00 |
| 2018/0029127 | A1* | 2/2018 | Ng | G02B 26/0825 |
| 2019/0120753 | A1* | 4/2019 | Prater | H01J 37/226 |
| 2019/0255614 | A1* | 8/2019 | Madigan | B23K 26/342 |
| 2020/0038954 | A1* | 2/2020 | Regulin | B23K 26/144 |
| 2020/0139632 | A1* | 5/2020 | Schulz | B23K 26/707 |
| 2021/0245251 | A1* | 8/2021 | Mattes | B29C 64/393 |
| 2021/0394302 | A1* | 12/2021 | Jacquemetton | G01J 5/08021 |

OTHER PUBLICATIONS

Wolfgang Schmidt, Improved defect detection with combined shearography and thermography, Dantec Dynamics: ICAIM 2012, International Conference on Applications for Image Based Measurements: Mar. 6-7, 2012 Ulm, DE.

Donadello Simone et al., Monitoring of laser metal deposition height by means of coaxial laser triangulation, Optics and Lasers in Engineering, Jan. 2019, available online Sep. 23, 2018, pp. 136-144, vol. 112, Elsevier, Amsterdam, NL.

Written Opinion for IT 202000006880 dated Dec. 23, 2020.

* cited by examiner

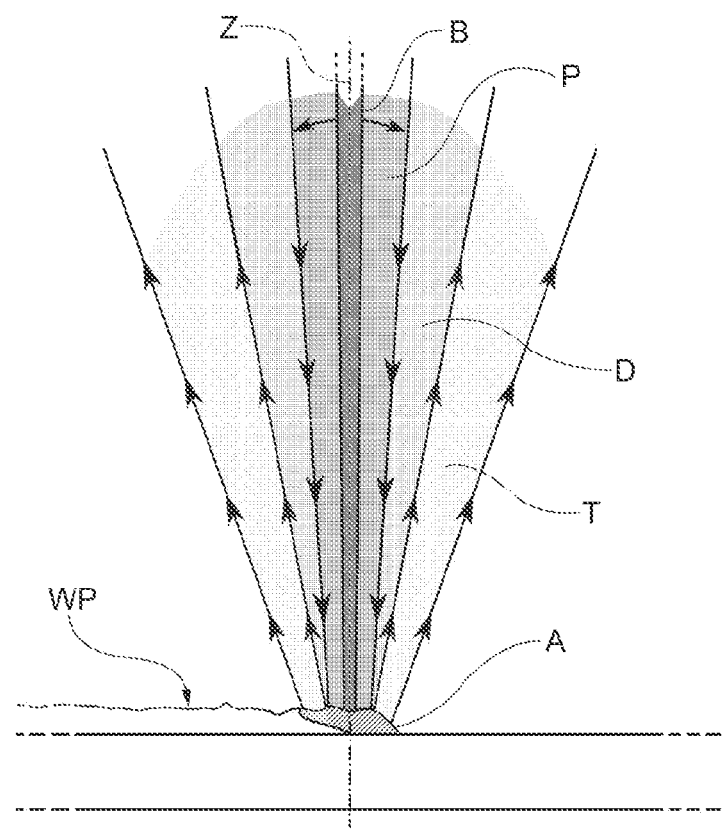
FIG. 1
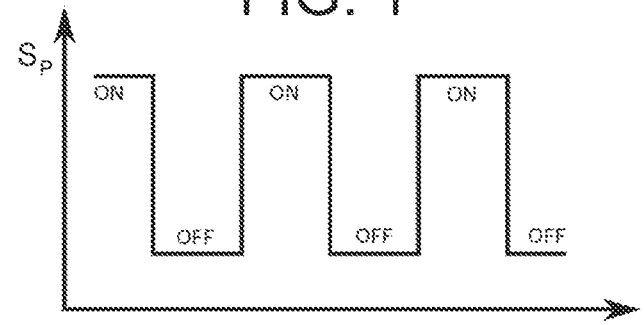
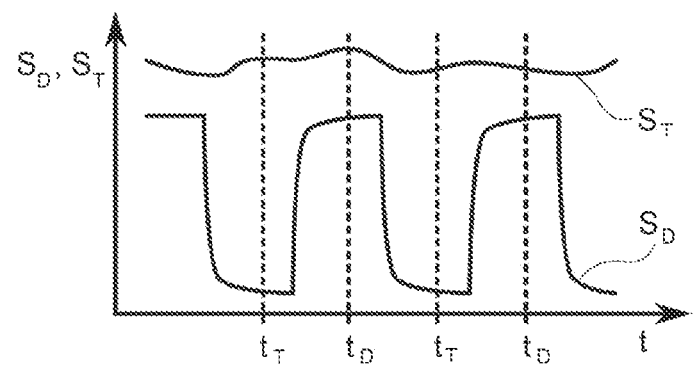
FIG. 3

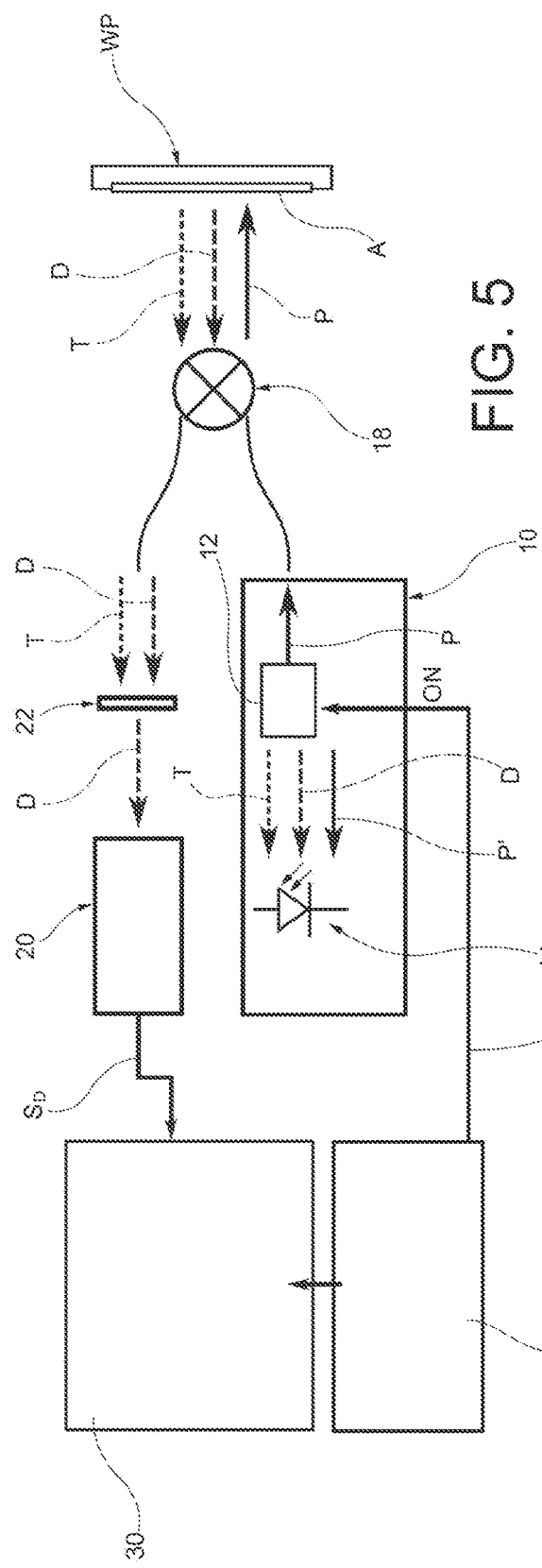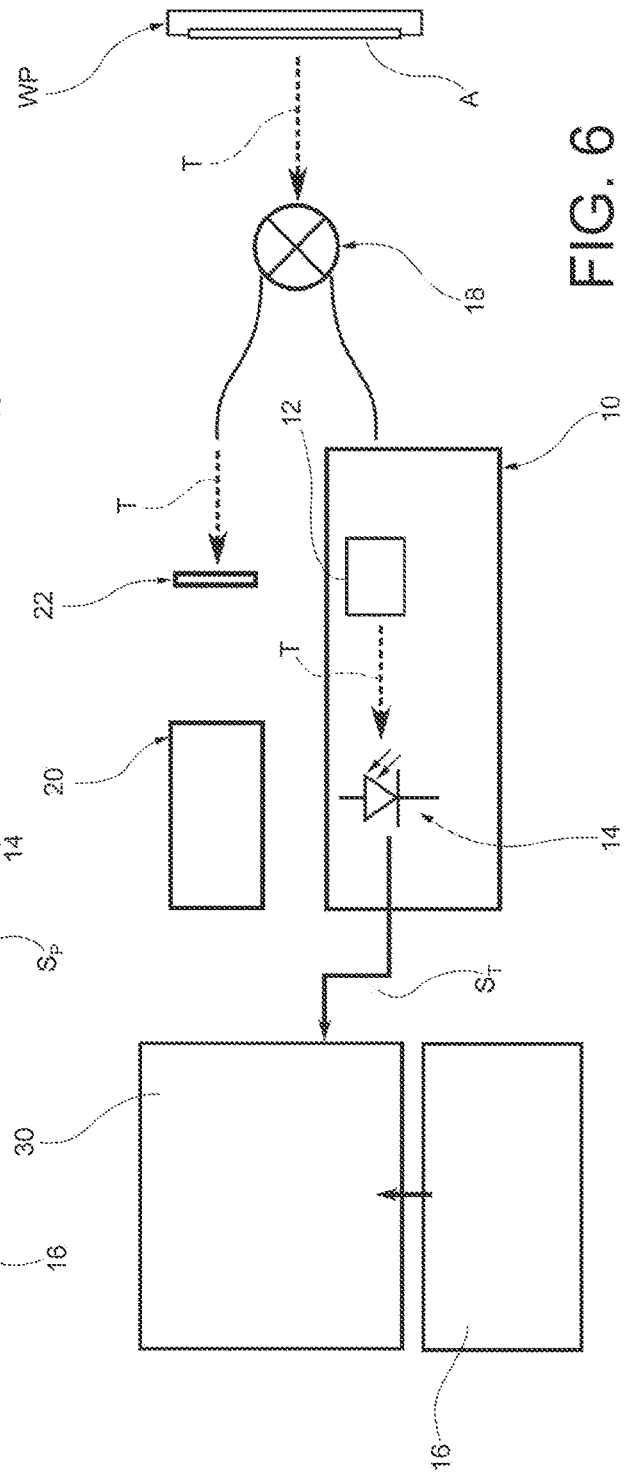
FIG. 5
FIG. 6

COMBINED OPTICAL SYSTEM FOR DIMENSIONAL AND THERMAL MEASUREMENTS, AND OPERATING METHOD THEREOF

CROSS REFERENCE TO RELATED APPLICATION

This application claims priority to and benefit of Italian Patent Application No. 102020000006880, filed on Apr. 1, 2020, which is fully incorporated by reference herein in its entirety.

FIELD OF THE INVENTION

The present invention relates in general to optical measurements and in particular to optical measurements of objects or materials subjected to industrial manufacturing processes. More specifically, the invention relates to a combined optical system and a method for determining the temperature of the surface of an object or material and its distance.

According to a further aspect, the present invention relates to a machine for laser processing of a workpiece or material.

In the following description and claims, the term "object" means a finished product being measured or a workpiece being processed. In the application to machine tools and in particular to laser processing machines, "workpiece" and, in the preferred embodiment, "metal workpiece" is used to identify any manufactured article, such as a sheet or an elongated profile having, without distinction, a closed cross section, for example circular, rectangular or hollow square, or an open cross section, for example a flat section or an L-, C-, or U-shaped section, etc. The term "material" or "precursor material" in additive manufacturing identifies the raw material, generally in powder form, subjected to localized sintering or melting by laser beam.

BACKGROUND OF THE INVENTION

In industrial processes it is common for a processing tool to approach an object, without coming into contact with it, or a material in order to process the object or material at a distance, for example by emitting radiation or working fluids. It is also known that a measuring instrument approaches a workpiece or a material being processed during a manufacturing process of a product, or even the finished product to detect some geometric features or physical properties during the suspension, course, or end of a manufacturing process.

Purely by way of example of an industrial manufacturing process, in the laser processing of materials, and of metal sheets and profiles in particular, laser radiation is used as a thermal tool for a wide variety of applications that depend on interaction parameters of the laser beam with the workpiece, specifically the energy density per incidence volume of the laser beam on the workpiece, and the interaction time interval.

The difference between the different types of processing that may be carried out on a material is substantially attributable to the power of the laser beam used and the interaction time between the laser beam and the material being processed. For example, by directing a low density of energy (on the order of tens of W per mm$^2$ of surface) for a prolonged time (on the order of seconds) on a metal material, a hardening process is carried out, whereas by directing a high energy density (on the order of tens of MW per mm$^2$ of surface) for a time on the order of femtoseconds or picoseconds on the same metal material, a photo-ablation process is carried out. In the intermediate range of increasing energy density and decreasing processing time, the control of these parameters allows welding, cutting, perforating, etching, and marking processes to be carried out. These processes take place by emitting the laser beam from a working head that operates away from the workpiece subjected to the process.

In additive processes, the material may, for example, be introduced in the form of a filament, in the form of powder emitted from a nozzle, or alternatively it may be present in the form of a powder bed. The material is then melted by laser radiation, obtaining a three-dimensional print following the re-solidification of the material.

In the field of laser processing of materials, a processing tool carried by a machine is adapted to generate a high-power focused laser beam having a preset transverse power distribution on at least one processing plane of the material and to govern the direction and the incidence position of the beam along the material, as well as to control, where necessary, the direction of a flow of assist gas which has mechanical propulsion functions on the molten material, or chemical functions to assist combustion, or even technological functions for shielding the processing region from the surrounding environment.

In industrial processes, wherein a processing tool approaches an object or a material, the results of the processing depend on the correct distance between the processing tool and the object or the material and on the power of the processing laser beam. For example, in the laser processing of a material, and specifically in controlling the laser processing of a metal material for laser cutting, drilling or welding of said material, or the additive manufacturing of predetermined structures starting from a powdered precursor material, it is important for the processing tool to be kept at a controlled distance from the workpiece or material and for the power of the laser beam focused on the work surface to be controlled in the energy range adapted to obtain the desired type of processing.

The distance of the processing tool from the processing material may be measured by measuring probes or sensors, e.g., time-of-flight laser scanners, laser triangulators, interferometers.

The power of the processing laser beam that impinges on the surface of the workpiece or material heats the workpiece or material and consequently causes the emission of optical radiation in the thermal band (infrared or visible) due to the processing temperature reached by the workpiece or material in the molten state, which is also maintained for a certain time (typically between a tenth of a second and a few seconds) when the processing laser beam is switched off. It is therefore possible to acquire information on the temperature of the workpiece or material being processed, and indirectly on the power of the processing laser beam, through the optical radiation thermally emitted by the surface of the workpiece or material, for example by pyrometers (radiation thermometers), or better, bicolor pyrometers that allow the temperature of a solid or molten body to be determined without knowing its emissivity.

Disadvantageously, conducting these measurements, both essential for controlling the industrial process, involves the use of two different devices, the dimensions of which may not be compatible with the spaces available in a processing tool or in proximity thereto, for example for the integration with a working head of a machine for the laser processing of a workpiece or material. This further entails a high cost and complexity for the system which includes different devices.

SUMMARY OF THE INVENTION

An object of the present invention is to provide an optical system for determining the temperature and distance of a scattering surface, such as the surface of an object or material, with respect to a predetermined reference point associated with the system, which may be made with a reduced number of components and therefore may be easily integrated into a processing tool of an industrial manufacturing machine, such as, a machine for the laser processing of a workpiece or material, without compromising measurement accuracy.

Another object of the present invention is to provide an optical system for the substantially simultaneous determination of the temperature and distance of the surface of an object or material.

It is a further object of the present invention to carry out a thermal measurement without adding complexity to a distance measuring apparatus.

An even further object of the present invention is to provide an optical system for determining the temperature of the surface of an object or material and its distance, which may be easily installed in a pre-existing industrial manufacturing machine.

Still yet a further object of the present invention is to provide a combined optical measurement system adapted to be installed in a working head of a machine for the laser processing of a workpiece or material in alignment with the processing laser beam to allow the execution of a coaxial measurement of the distance separating the working head and the surface of the workpiece or material and the temperature of the molten material locally in the area currently being processed by the laser beam.

These objects are achieved by a combined optical system as described and claimed herein.

Particular embodiments are also described.

The present invention also relates to a method for determining the temperature of the surface of an object or material and its distance with respect to a predetermined reference point associated with said combined optical system.

The present invention further relates to a machine for the laser processing of a workpiece or material which comprises said combined optical system.

In summary, the present invention is based on building a combined optical system, wherein the distance measurement of an object or material, obtained by detecting a probe radiation scattered by the surface of the object or material, and the measurement of its surface temperature, obtained by detecting an optical radiation thermally emitted from the surface of the object or material, occur at alternating times correlated to the activation or deactivation, respectively, of a source of a probe radiation. The detection of the probe radiation scattered by the surface of the object or material and of the optical radiation thermally emitted from the surface of the object or material occurs at dedicated detection devices or—more advantageously in an integrated form—at a common detection device.

More specifically, the combined optical system of the present invention comprises an optical radiation source adapted to emit at least one optical probe radiation at a predetermined wavelength or in a predetermined wavelength range. The optical radiation source may be a single source, for example a light-emitting diode, such as a laser diode or a superluminescent diode, or a pair of distinct sources adapted to emit respective beams of optical radiation at different wavelengths or at alternate intervals, although it is also possible to emit beams of optical radiation at different wavelengths or at alternate intervals through a single source, for example by varying the excitation current or the temperature of the source in the first case, or by using a source in which the beam is divided along two different optical paths, switching between one path and the other, for example by liquid crystals or mechanical shutters which block or allow the beam to pass alternately in one path or the other.

Means for controlling the optical radiation source, for example electronic control means such as a processor or the like, are arranged to selectively control switching of the optical radiation source from an operative condition, in which the optical radiation source emits at least one optical probe radiation, to an inoperative condition, in which the optical radiation source does not emit any optical radiation. Advantageously, the control means are arranged to alternately control switching of the optical radiation source from the operative condition to the inoperative condition according to a predetermined switching frequency. In an embodiment wherein the optical radiation source comprises a light-emitting diode having an active region capable of emitting photons at optical frequencies following radiative recombination of the charge carriers confined therein as a result of a population inversion condition, the control means are arranged to control selectively activation and deactivation of the excitation current of said light-emitting diode, adapted to alter the thermodynamic equilibrium of the populations of the charge carriers. In conditions of high switching frequency (on the order of 1-100 kHz) and in application to an industrial process wherein the advancement rate is lower, the two measurements may be considered substantially simultaneous, and the system may be defined as a continuous hybrid measurement system.

Optical detectors comprising at least one photodetector or a linear or two-dimensional array of photodetectors or similar optical sensors may detect at least one scattered optical radiation and one optical radiation thermally emitted from the surface of said object or material (typically in the infrared spectrum at room temperature, but in a range of wavelengths typically detectable in the near-infrared spectrum and in the visible spectrum in the case of molten metal).

The system further comprises electronic processing means, such as a processor, which are arranged to determine a distance of the surface of the object or material from a reference point of a reference system of the optical system or permanently associated therewith on the basis of the optical probe radiation scattered by the surface of the object or material and received by the detectors, for example, as a function of the incidence position (which is a function of the incidence direction), the intensity, or the incident phase on the photodetector or on the linear or two-dimensional photodetector array or on a similar optical sensor assembly. The electronic processing means are also arranged to determine a local temperature of the surface of the object or material, on the basis of the optical radiation thermally emitted from the surface of said object or material, received by the detectors, for example as a function of the emission intensity in a predetermined spectral range or the spectral wavelength distribution of the thermally emitted optical radiation. "Local temperature" means the surface temperature of the workpiece in the area on which the probe radiation is directed, in the application to an industrial process substantially in the area currently being processed.

The electronic processing unit is synchronized with the control unit of the optical radiation source in such a way as to determine the distance of the object or material on the basis of the scattered optical probe radiation received by the optical detectors when the optical radiation source is operative, and to determine a local temperature of the surface of the object or material on the basis of the thermally emitted optical radiation received by the detectors when the optical radiation source is inoperative.

In a compact embodiment, the optical detectors include photodetectors having a spectral sensing range comprising the predetermined wavelength (or the predetermined wavelength range) of the optical probe radiation scattered from the surface of the object or the material and at least one wavelength of the optical radiation thermally emitted from the surface of said object or material.

The photodetectors may be arranged separately from the optical radiation source.

Advantageously, in an integrated embodiment, the optical detectors include at least one monitoring photodetector device normally coupled to an optical radiation source, such as a laser diode or a superluminescent diode, typically integrated in the respective packaging, adapted to detect a secondary or partial optical radiation emitted by the source, representative of the primary optical radiation. For example, in the case wherein the optical radiation source comprises a light-emitting diode which has a primary radiation emitting area and a secondary radiation emitting area, the monitoring photodetector device faces the secondary radiation emitting area, generally the back face of the light-emitting diode, opposite the luminous radiation face.

According to this configuration, the primary optical probe radiation scattered coaxially from the surface of said object or material is at least partially collected by the primary emitting area of the light-emitting diode (the part received within its numerical aperture) and from there back-propagated within the active region of the diode to the monitoring photodetector device. In this way, the primary optical probe radiation scattered from the surface of said object or material is at least partially superimposed on the secondary or partial optical radiation emitted by the diode on a common incidence region of the monitoring photodetector device. The monitoring photodetector device is adapted to detect an interference fringe pattern between the secondary or partial optical radiation and the primary optical probe radiation, and the processing means are arranged to determine the distance of the surface of said object or material with respect to the optical radiation source on the basis of the interference fringe pattern, according to a technique known as "self-mixing interferometry."

In a different aspect of the invention, the optical detectors include first photodetector devices adapted to intercept at least part of the optical probe radiation scattered by the surface of the object or material and second photodetector devices adapted to intercept at least part of the thermally emitted optical radiation from the surface of said object or material. The first photodetector devices comprise a photodetector array extended along at least one spatial direction, i.e., a linear or two-dimensional photodetector array, and to the photodetector devices are coupled wavelength filtering means, adapted to transmit the predetermined wavelength or the predetermined wavelength range of the optical probe radiation scattered from the surface of said object or material and to block wavelengths of the thermally emitted optical radiation from the surface of said object or material or other wavelengths of spurious environmental radiation. Optionally, wavelength filtering means may also be placed in front of the second photodetector devices to select a predetermined portion of the wavelength spectrum of the thermal emission.

In this case the optical radiation source and the first photodetector devices take on different embodiments depending on the techniques applied for analyzing the scattered radiation.

The preferred techniques for analyzing scattered radiation for determining the distance are triangulation and optical interferometric (coherent light, low coherence in the time, frequency or space domain, "self-mixing interferometry") techniques.

In a triangulation technique, a photodetector array is arranged in such a way to receive the optical probe radiation scattered by the surface of the object or material according to a direction of observation at a non-zero angle with respect to the emission direction of the optical probe radiation, and the processing means are arranged to determine the distance of the surface of the object or material with respect to the optical radiation source on the basis of the incidence position of the optical probe radiation scattered along at least one direction of extension of the photodetector array.

Alternatively, the optical radiation source may be coupled to downstream beam-shaping means adapted to shape the optical probe radiation into a beam having a variable predetermined transverse power distribution along the propagation axis. The processing means are arranged to determine the distance of the surface of the object or material with respect to the optical radiation source on the basis of the transverse power distribution of the scattered optical probe radiation detected by the photodetector array.

Alternatively, the optical radiation source may be adapted to emit first and second coaxial beams of optical probe radiation having different transverse power distributions, and the processing means are arranged to determine the distance of the surface of the object or the material with respect to the optical radiation source on the basis of the differential comparison between the transverse power distribution of the first scattered optical probe radiation beam and the transverse power distribution of the second scattered optical probe radiation beam, as detected by the photodetector array.

The first and second optical probe radiation beams have different polarizations, preferably orthogonal polarizations, or different wavelengths, or are emitted at alternate intervals. Advantageously, in order to be able to emit a first and a second optical probe radiation beam at different wavelengths or at alternate intervals, the optical radiation source comprises a pair of distinct optical radiation sources.

According to a further alternative wherein the triangulation method is omnidirectional, the optical radiation source is adapted to emit an optical probe radiation comprising a plurality of collimated or focused beams arranged symmetrically with respect to a propagation axis, and the processing means are arranged to determine the distance of the surface of the object or material with respect to the optical radiation source on the basis of the comparison between the mutual incidence position of said plurality of beams of the optical probe radiation scattered on the photodetector array.

In an interferometric technique, the optical radiation source is adapted to emit a first beam of optical probe radiation and a second beam of said optical radiation as a reference. The first optical probe radiation beam is conducted toward the surface of the object or material and the beam reflected or scattered from the surface of the object or material is conducted toward an interferometric optical sensor, through an optical measurement path. The second reference optical radiation beam is conducted toward said interferometric optical sensor through a reference optical path of predetermined optical length, preferably equivalent within the coherence length of the radiation to the optical length of the optical measurement path in a nominal operating condition, wherein the position of the surface of the object or material is a predetermined nominal position with respect to a predetermined reference system. The first and second beam are superimposed on a common incidence region of the interferometric optical sensor forming an interference fringe pattern, and the processing means are arranged to determine the distance of the surface of the object or material with respect to the optical radiation source on the basis of the interference fringe pattern.

Expediently, in determining the temperature, the processing means are arranged to normalize the thermally emitted optical radiation intercepted by the photodetectors as a function of the determined distance from the surface of the object or material. This allows a correct estimate of the temperature to be obtained in the case of illumination of the object or material by focused beams, whereby the illuminated area on the workpiece varies along the propagation axis, as well as by compensating for the morphology of the object.

The combined optical sensor subject of the invention and the hybrid or combined measurement method that uses said sensor may be advantageously used in the advanced closed-loop control of industrial manufacturing processes such as the laser processing of workpieces or material, for example for cutting, welding, or additive manufacturing, where distance and temperature measurements need to be taken. The acquisition of the working temperature may be used to stabilize thermal processes in progress, while the acquisition of the distance may be used to verify or improve the dimensional accuracy and the positioning precision of the processing in progress. The system subject of the invention remedies the disadvantage of having separate measuring instruments, such as pyrometers and distance sensors, in favor of a more compact solution, possibly integrated with the same emission source as the probe radiation, which allows for the detection of the thermal radiation emitted by the surface being measured in an area corresponding to the surface area whose distance is measured.

Further features and advantages of the present invention will be described in greater detail in the following detailed description of an embodiment thereof, given by way of non-limiting example, with reference to the accompanying drawings.

BRIEF DESCRIPTION OF THE DRAWINGS

FIG. 1 is a schematic representation of an incidence condition of an optical probe radiation beam in a measurement area of a workpiece or material being processed, with relative backscattering of a probe radiation beam and emission of a thermal radiation beam;

FIG. 3 shows diagrams which represent the time trend of the optical probe radiation, the scattered optical probe radiation and the optical radiation thermally emitted from the surface of an object or material being measured;

FIG. 5 shows the block diagram of the combined optical system of the present invention in an operating condition for measuring distance;

FIG. 6 shows the block diagram of the combined optical system of the present invention in an operating condition for measuring temperature;

DETAILED DESCRIPTION

Figure 2:
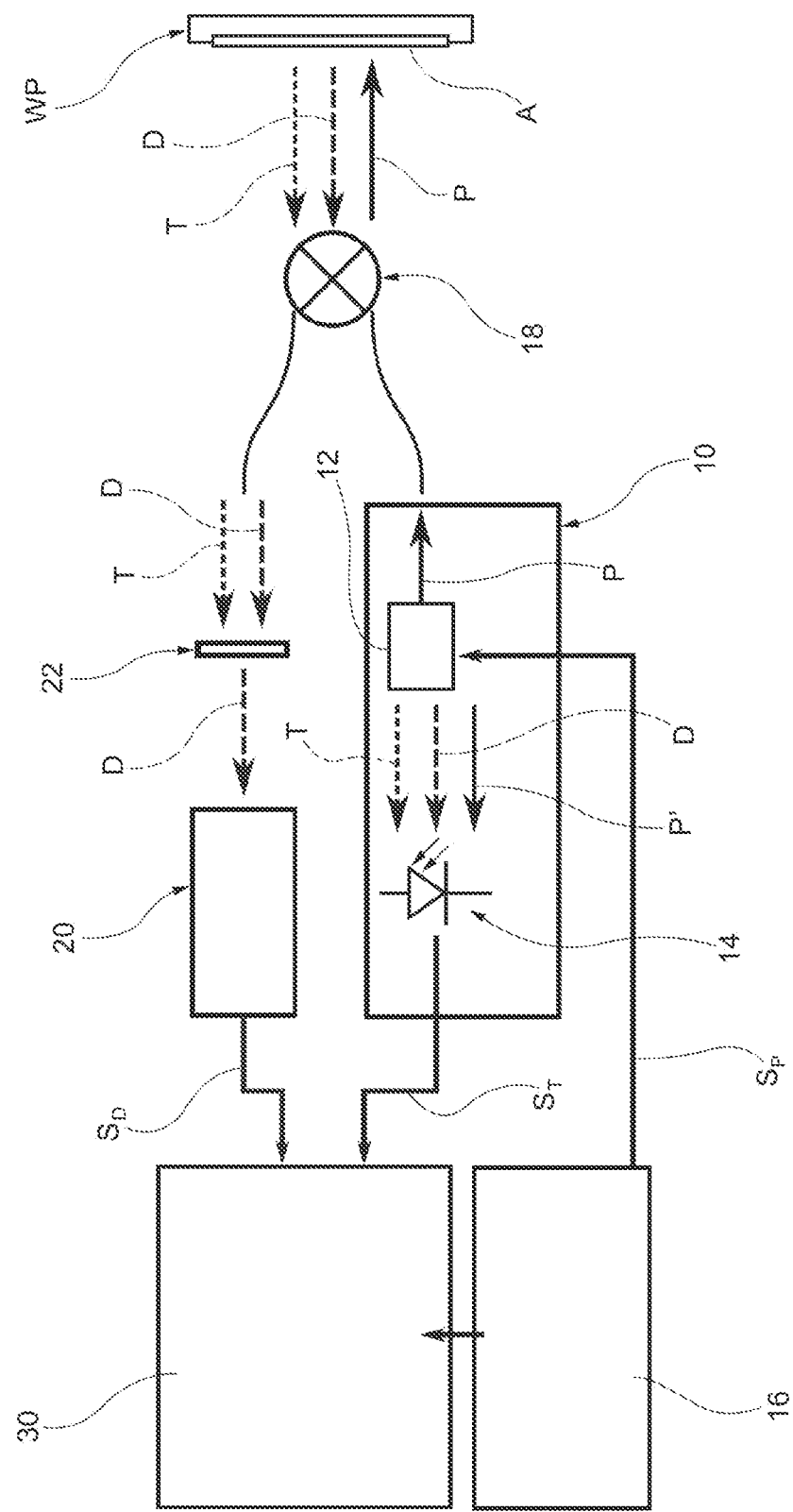
FIG. 2 is a block diagram of a combined optical system of the present invention.

The following description generally relates to the configurations and operation of a combined optical system for determining the temperature of an object or material and its distance with respect to a predetermined point of a reference system associated with the combined optical system. More particularly, the combined optical system of the present invention is adapted to determine the temperature and the distance of the surface of said object or material. In an applied example, the system of the present invention is described as coupled to a machine for the laser processing of a workpiece or material, and the reference system associated with the combined optical system is also permanently associated with the reference system of a working head of the laser processing machine, whereby the determination of the distance of the surface of an object or material with respect to a point of the combined optical system that carries out the measurement may be traced, using simple rototranslation transformations, to the determination of the distance of the surface of said object or material with respect to the working head of the laser processing machine.

FIG. 1 shows a schematic representation of a condition for measuring the distance and temperature of an area of the surface of an object or material, with particular reference to the laser processing of a workpiece or material WP. Reference A indicates an area currently being processed, on which a processing laser beam B used for cutting, welding or sintering impinges according to a predetermined direction of propagation Z, as a result of which the temperature of the area rises with respect to the environment. Representations of any filler material or assist gas are omitted, which a person skilled in the art may easily consider as a function of the envisaged processing, as they are not significant for the purpose of this description.

In a preferred embodiment, coaxially to the processing laser beam B an optical probe radiation P impinges on the area A and is reflected therefrom, emerging as scattered optical probe radiation D. At the same time, the surface of the workpiece WP in the area A currently being processed also emits thermal radiation T.

More generally, and from a geometric point of view, the optical probe radiation may be a single beam or an envelope of multiple beams, for example a single collimated beam—which may be approximated as a single optical beam—coaxial or inclined with respect to the propagation axis of the processing laser beam, a plurality of beams impinging on the surface of the workpiece in different positions or with different inclination angles with respect to the propagation axis of the processing laser beam, one or more shaped beams, for example focused beams or beams with their transverse power distribution controlled according to a predetermined shape (for example, annular), for example a predetermined shape that is variable along the propagation axis.

In general, depending on the properties of the surface of the workpiece or of the material being processed, the backscattering of the probe radiation beam P results in a back-propagated probe radiation beam D scattered according to a scatter angle greater than the transverse distribution of the incident beam. The beam of the thermally emitted radiation T is in turn scattered at an even wider angle.

FIG. 2 shows a block diagram of a combined optical system of the invention.

An assembly of an optical probe radiation source is indicated with 10, which includes in this embodiment a source of optical probe radiation in the form of a light-emitting diode 12 such as an LED, superluminescent diode or laser, comprising an active semiconductor region capable of emitting photons at optical frequencies following radiative recombination of the charge carriers confined therein as a result of excitation or a population inversion condition. The light-emitting diode 12 has a primary emitting area of a primary optical probe radiation P, for example a front face of the active region, and a secondary emitting area of a secondary optical radiation P′ correlated to said primary optical probe radiation, for example a rear face of the active region opposite the front face.

Reference 14 indicates a monitoring photodetector device normally coupled to the light-emitting diode, facing the secondary radiation emitting area of the diode to detect the intensity of the secondary radiation indicative of the actual emission intensity of the diode 12.

An electronic unit for controlling activation and deactivation of the light-emitting diode 12 is indicated with 16, and is arranged to alternately (iteratively) control the switching of the light-emitting diode 12 from an operative condition to an inoperative condition according to a predetermined frequency through a driving signal Sp.

A device 18 for splitting/recombining the beam is interposed along the propagation path of the probe radiation P (which may be in free space or at least partially guided) in such a way as to be crossed by the probe radiation P coming from the source 12 without appreciable loss or for extracting a reference beam of the probe radiation for distance measurements based on interferometric techniques.

According to the representation in FIG. 1, the workpiece is marked WP. As a result of the incidence of the probe radiation P, said workpiece backscatters a scattered probe radiation D, and, as a result of the incidence of a processing laser beam (not shown), said workpiece scatters a thermally emitted optical radiation T. Both the scattered probe radiation D and the thermally emitted radiation T propagate through the beam splitting/recombining device 18 from which they are directed toward the source assembly 10, in which the photodetector device 14 is located, and toward detectors 20 for detecting the scattered probe radiation, external to the source assembly 10. In the case of polarized beams (obtainable by interposing optical elements in the propagation path for manipulating the polarization of the beam, such as a polarizer or quarter-wave delay plates), the routing of the optical probe radiation beam and the scattered optical probe radiation beam may be expediently obtained by separating the two radiations using a polarization selection criterion.

Upstream of the detectors 20, an optical filter 22 may be arranged, which is adapted to transmit the wavelength or wavelength range of the scattered optical probe radiation from the surface of the workpiece WP and to block the wavelengths of the thermally emitted optical radiation coming from the surface of said workpiece WP.

An electronic processing unit 30 is coupled to the source assembly 10 and to the detectors 20 and is arranged to receive a signal SD indicative of the scattered probe radiation D detected by the detectors 20 and a signal ST indicative of the thermal radiation T detected by the photodetector device 14. The processing unit 30 is arranged (i) to apply a predetermined algorithm or calculation model based on the analysis of the properties of the scattered radiation, such as phase, position, direction, transverse power distribution, to determine the distance of the surface of the workpiece WP with respect to a predetermined reference point of the system, for example the position of the source of the probe radiation 12 in a predetermined reference system, permanently associated with the laser processing machine, on the basis of the signal indicative of the scattered optical probe radiation D, and (ii) to apply a predetermined algorithm or calculation model to determine the local temperature of the surface of the workpiece WP on the basis of the signal indicative of the thermally emitted radiation T.

The processing unit 30 is further coupled to the electronic control unit 16 to operate in synchronism with the activation and deactivation of the light-emitting diode 12, so as to determine the distance of the surface of the workpiece WP when the light-emitting diode is active and to determine the local temperature of the surface of said workpiece WP when the light-emitting diode is deactivated.

The operation of the system and of the control unit 16 in particular is better described with reference to the diagrams of FIG. 3, which represent the time trend of the optical probe radiation emitted by the diode 12, the optical probe radiation scattered by the surface of the workpiece WP and the optical radiation thermally emitted from the surface of the workpiece WP.

The first diagram shows the time trend of a driving signal SP of the light-emitting diode 12, and therefore represents the nominal time trend of the optical probe radiation. The driving signal Sp oscillates alternately between the activation periods of the emission of the probe radiation, indicated with ON, and the deactivation periods of the emission of the probe radiation, indicated with OFF. The square wave signal waveform is purely indicative of a periodic control waveform. Other waveforms may be contemplated, for example sinusoidal.

The second diagram shows the trend of the signal SD indicative of the scattered probe radiation D detected by the detectors 20 and 14 and of the signal ST indicative of the thermal radiation T detected by the photodetector device 14. The time instants $t_T$ and $t_D$ respectively indicate the sampling instants of the thermal radiation T for determining the temperature and the sampling instants of the scattered probe radiation D for determining the distance of the workpiece.

The method for determining the local temperature of the surface of the workpiece WP and its distance is based on the iterative selective control in switching of the optical probe radiation source between an operative condition, wherein the optical probe radiation is emitted, and an inoperative condition, wherein the optical probe radiation is not emitted, respectively, and on the acquisition of the signals indicative of the optical probe radiation scattered by the surface of the workpiece WP when the optical probe radiation source is operative, i.e., when said scattered probe radiation is established, and on the acquisition of signals indicative of the thermally emitted radiation from the surface of the workpiece WP when the optical probe radiation source is not operational, i.e., when said thermally emitted radiation is the only radiation present (except for the laser radiation of the manufacturing process and any spurious environmental radiation).

In practice, when the light-emitting diode 12 (the optical probe radiation source) is active, i.e., in the intervals indicated ON in FIG. 3, the scattered optical probe radiation is aimed at the detectors 20 for the distance measurement. The detectors 20 may coincide with the photodetector device 14 of the source assembly of the optical probe radiation when a "self-mixing interferometry" technique is applied. When the light-emitting diode 12 (the probe radiation source) is not active, i.e., in the intervals indicated OFF in FIG. 3, the photodetector device 14 of the source assembly detects the thermal emission over a predetermined spectral range for estimating the temperature.

In this way, a combination of the two measurements is effectively obtained.

A repetitive switching frequency of the emission of the optical probe radiation, in the range from 1 to 100 kHz, is considered by the inventors to be high enough to be able to approximate the measurements as simultaneous and continuous in the course of a laser manufacturing process. Advantageously, this hybrid configuration allows a remote and rapid optical measurement of the temperature and distance of a hot workpiece through a single optical system. Equally advantageously, the combined optical system, and in particular the source assembly of the optical probe radiation, may be coaxially aligned to the process laser beam, and the temperature of the molten material may be easily determined through a pyrometric approach. In this way, the parameters of a laser manufacturing process, for example for cutting, welding, additive manufacturing, may be efficiently controlled in real time, the process control thus being improved.

Furthermore, since in the case of an uncollimated probe beam the thermally emitted radiation received by the photodetector device 14 varies with the distance, it is possible to normalize the reading of the intensity of the thermally emitted radiation from the determination of the distance occurring in the previous sampling period, for example by compensating for the variability of the collecting numerical aperture, corresponding to the variability of the numerical aperture of the optical path of the measurement beam.

It should be noted that the synchronization of the electronic processing unit 30 with the electronic control unit 16 makes it possible to recognize and separate the readings of the scattered probe radiation and the thermally emitted radiation through demodulation techniques similar to those used in amplifiers of the lock-in type, or by digital discrimination by the acquisition system, if the sampling frequency is much higher than the switching frequency.

In compact configurations, photodetectors may also be used which have a wide spectral detection range, and therefore adapted to acquire optical radiation over a broad spectrum of wavelengths, which includes the wavelength or the wavelength range of the probe radiation, as well as the range of interest of the thermal emission wavelengths for the processing in progress.

The function of the detectors 20 may be performed by the photodetector device 14 in an integrated configuration of the system wherein the photodetector device 14 is also responsible for detecting the scattered probe radiation D in addition to the thermally emitted radiation T. This is possible, for example, if a source optical radiation assembly of the type shown in FIG. 4a is used.

Figure 4A:
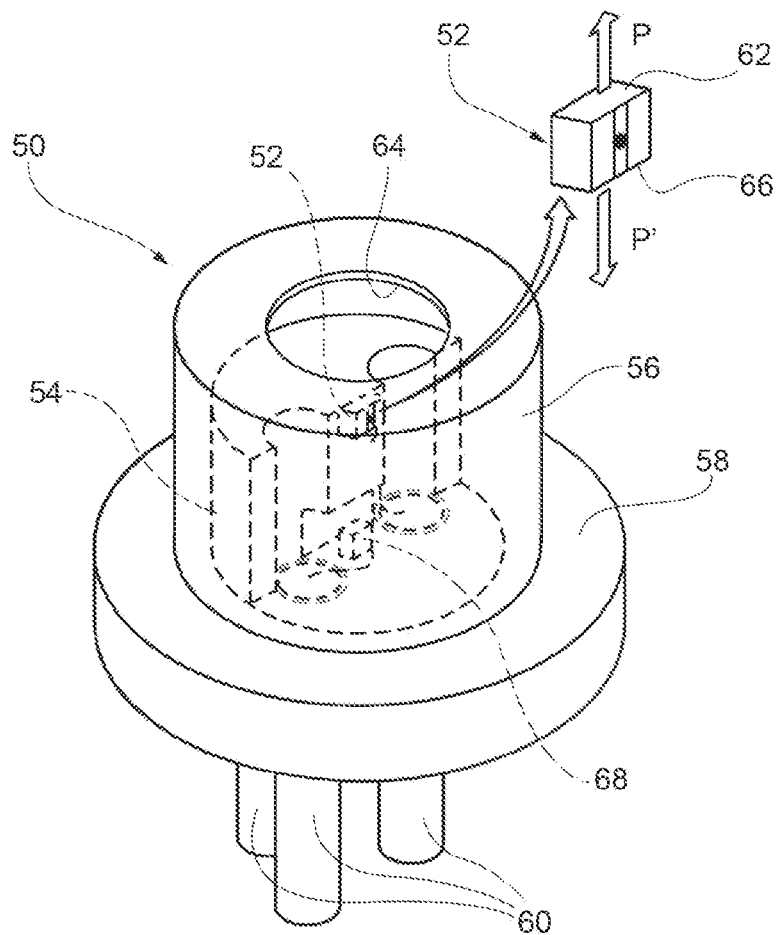
FIGS. 4a and 4b respectively show an assembly of an optical radiation source such as a laser diode according to the prior art and an optical path diagram of such an assembly.

In FIG. 4a, reference 50 generally indicates an assembly of an optical radiation source in a TO-CAN packaging according to the prior art, including a laser diode 52 arranged on a heat-dispersing support 54 and surrounded by a protective casing 56, arranged on a base 58 carrying the electrical connections 60 for driving the diode. In the enlargement, the laser diode 52 is shown, and a primary radiation emitting area 62, facing a radiation output window 64, and a secondary radiation emitting area 66, facing the rear of the laser diode 52 with respect to the radiation output window 64, are identified. Facing the secondary radiation emitting area 66, behind the laser diode 52, a monitoring photodetector device 68 is arranged.

Figure 4B:
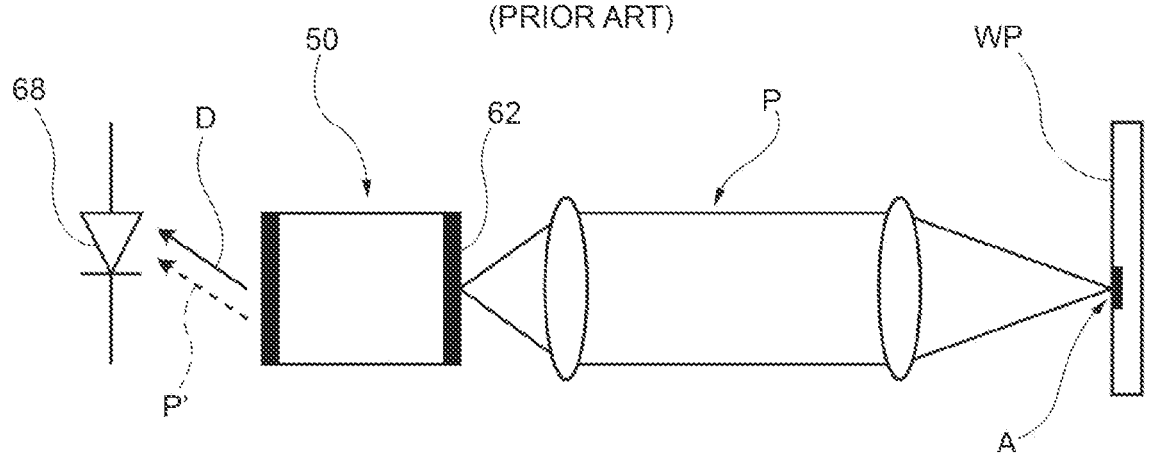
Figure 7:
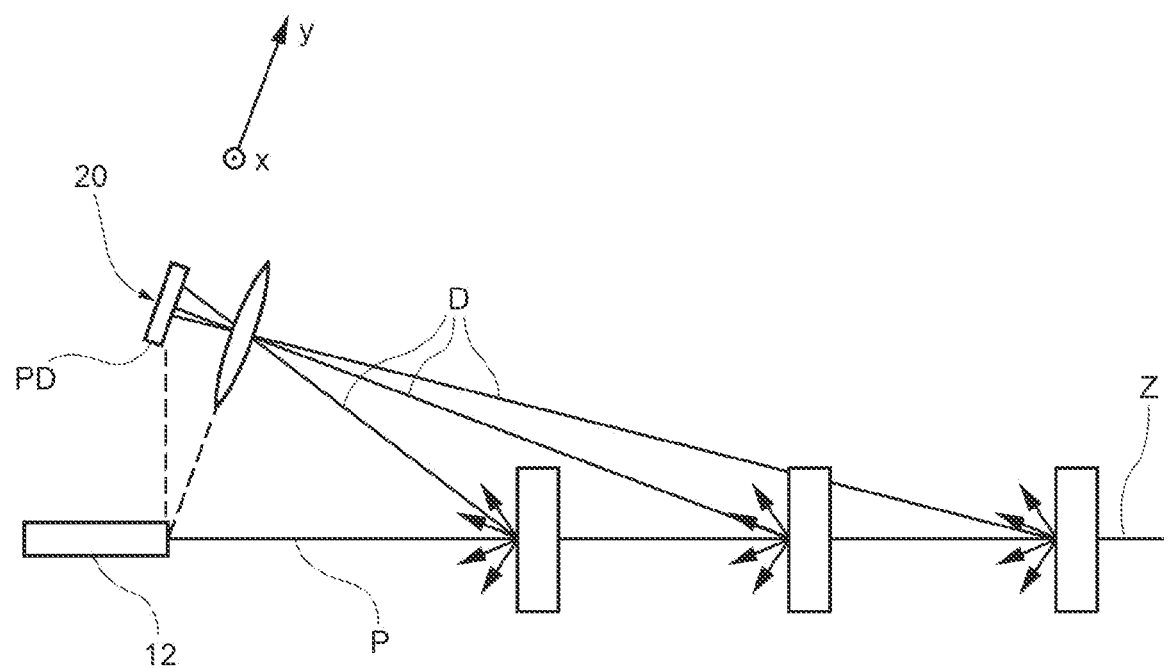
FIG. 7 is a diagram of the distance measurement by triangulation with probe radiation source and off-axis scattered probe radiation detector, according to the prior art.

An optical path diagram of a source assembly 50 is shown in FIG. 4b. The primary optical probe radiation beam P emitted by the primary radiation emitting area 62 of the laser diode 52 passes through various optical elements to collimate and focus said beam and impinges on a scattering surface of a workpiece WP to be analyzed at the current processing area A, possibly coaxial to the optical propagation system of the laser processing beam (not shown). At the same time, the secondary optical radiation beam P' representative of the primary optical probe radiation is emitted in the opposite direction toward the monitoring photodetector device 68. Considering the reversibility of the optical path, the optical radiation D reflected or scattered by the surface of the workpiece WP is at least partially coupled in the opposite direction along the same direction of propagation to the extent in which said radiation lies within the numerical aperture of the optical path and retraces the path until it crosses the laser diode 52 and impinges on the monitoring photodetector device 68, where it interferes with the secondary optical radiation beam P', forming an interference fringe pattern which makes it possible to apply the interferometric analysis technique known as "self-mixing interferometry." This technique is used in a wide range of applications, from vibration measurement to depth measurement, for example in laser ablation processes.

FIGS. 5 and 6 show the configurations for detecting the scattered optical radiation and the optical radiation thermally emitted from the surface of the workpiece WP with reference to the block diagram of the combined optical system of the invention represented in FIG. 2.

Specifically, FIG. 5 shows a configuration in an operative condition for measuring the distance of the workpiece WP, in which the control unit 16 applies a driving signal Sp to the light-emitting diode in the ON time interval, and the processing unit 30 acquires a signal SD indicative of the scattered probe radiation D detected by the detectors 20, while FIG. 6 shows a configuration in an operating condition for measuring the temperature of the workpiece WP, in which the control unit 16 does not apply any driving signal Sp to the light-emitting diode in the OFF time interval, and the processing unit 30 acquires a signal ST indicative of the thermal radiation T detected by the photodetector device 14.

FIGS. 7 to 11 show some configurations of the probe radiation and of the combined optical system of the invention used in the application of triangulation techniques for determining the distance of the workpiece WP from the source of the probe radiation.

The triangulation principle may be used to determine the distance of the workpiece from geometric considerations. For example, in a classic triangulation configuration shown in FIG. 7 with the radiation source 12 and the scattered radiation detectors 20 off-axis, if Z indicates the axis along which the distance is measured, the position of the incidence area of the probe radiation projected in the X-Y plane depends on the distance of the workpiece if the probe radiation beam has a non-zero angle of inclination with respect to the direction of observation. The measurement may therefore be performed by detecting the probe radiation scattered by the workpiece on a linear or two-dimensional photodetector array PD. Both in the case of a single probe radiation beam and in the case of multiple probe radiation beams, if they are inclined with respect to the observation axis, their apparent position on the photodetector array PD depends linearly on the distance. In these cases, it is preferable to use a single collimated beam as probe radiation, although this configuration may introduce anisotropic phenomena if along the propagation direction the optical path of the beam is obstructed, or if the reflectivity varies according to the inclination of the surface under examination, or if the measurement beam leaves said measurement area as the distance varies.

In the more general case of using a probe radiation beam with controlled shaping, wherein the beam has a variable shape along the propagation axis Z (for example with a variation in the diameter of the focused beam), the distance of the workpiece along the rotation axis Z may be determined by observing the shape of the beam of the scattered probe radiation projected on the photodetector array PD, possibly in combination with the knowledge of the position of the incidence area. In such cases the distance may be determined if the beam shape of the probe radiation is known, for example following a preliminary calibration.

Figure 8:
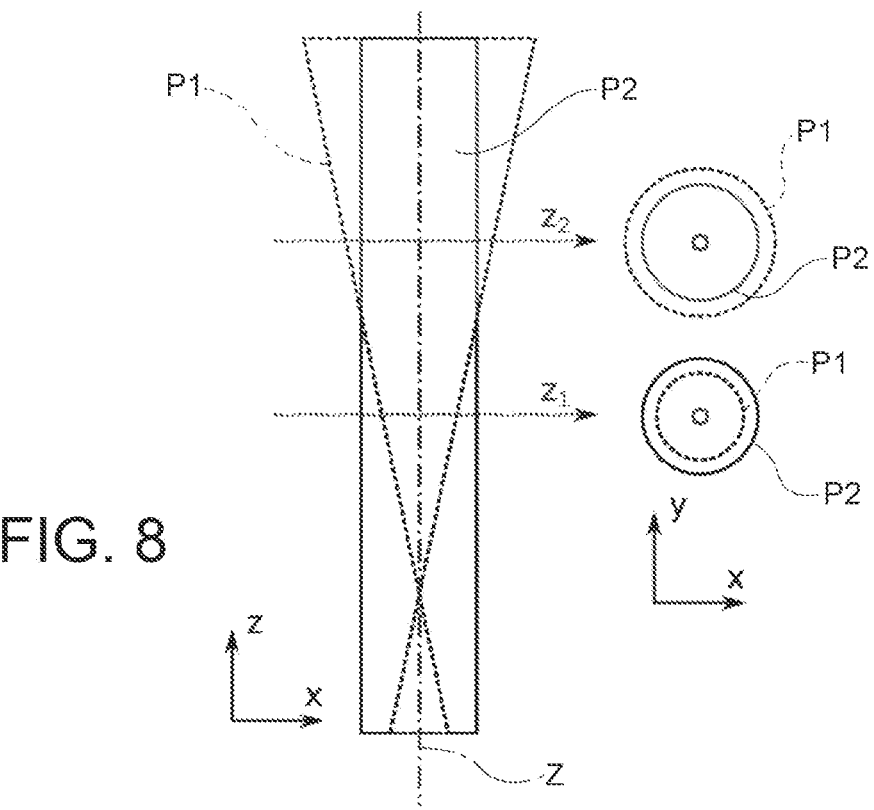
FIG. 8 is a diagram of the distance measurement by coaxial triangulation with optical probe radiation beams having different shapes.

With reference to FIG. 8, it is possible to simultaneously use two probe radiation beams having different shapes, for example beams collimated in a different way. The two beams may be aligned or preferably superimposed coaxially so as to impinge on the same area of the surface of the workpiece. One of the two beams (preferably a collimated beam) may be considered as a reference beam in such a way as to obtain an absolute distance measurement from the comparison between the shapes of the two incidence spots of the beams on the photodetector array PD.

This differential measurement requires no absolute calibration and therefore provides more reliable results. FIG. 8 shows a first probe beam P1 and a second coaxial probe beam P2, wherein the first beam P1 has a transverse power distribution trend variable along the propagation axis Z, while the second beam P2 has a constant transverse power distribution trend. FIG. 8 shows the comparison between the transverse dimensions of the two beams at two different propagation distances.

Figure 9:
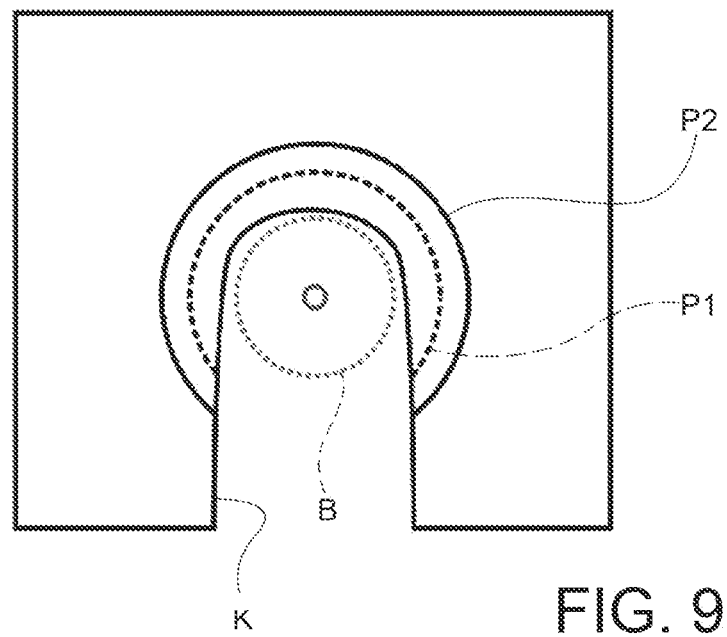
FIG. 9 shows the diagram of the distance measurement by coaxial triangulation of FIG. 8 applied to a laser cutting process.

FIG. 9 shows an incidence area of a pair of coaxial probe radiation beams on a surface of a workpiece in a processing area of the workpiece on which a processing laser beam, indicated with B, impinges, generating a cut K in the workpiece. Advantageously, the symmetry of the pair of beams makes it possible to remedy the presence of the cut K. A similar technique is advantageously applied also in the case of laser beams for welding or perforation.

Various methods may be considered to distinguish between the two beams in a differential measurement technique as described above. For example, the two beams may have different polarizations and may be distinguished by using two sensors adapted to detect separate orthogonal polarizations by a beam splitter device according to the polarization. According to other examples, the two beams may have different wavelengths and therefore be distinguished by using two sensors adapted to detect different spectral regions by dichroic mirrors or spectrum filters. According to yet another example, two pulsed beams may be used, i.e., two beams which are selectively and alternately activated in such a way as to be read by a single sensor, correlating in the time domain the reading of the same with a command signal from the source.

Figure 10:
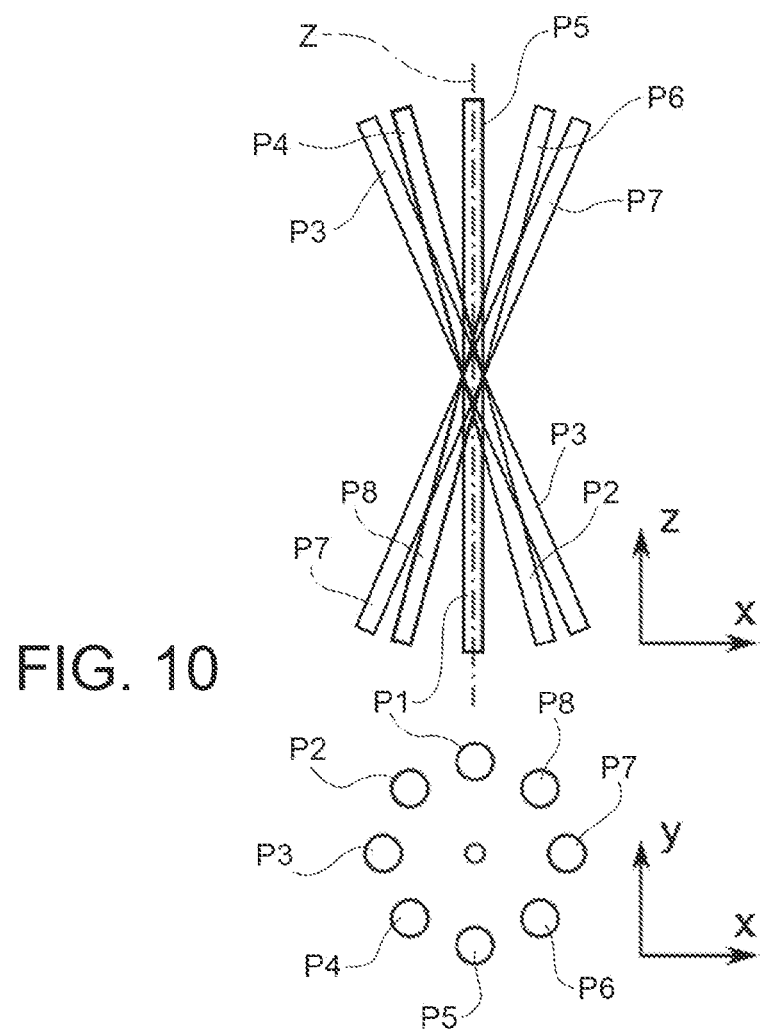
FIG. 10 is a diagram of the distance measurement by coaxial triangulation with multiple optical probe radiation beams arranged symmetrically to the propagation axis.
Figure 11:
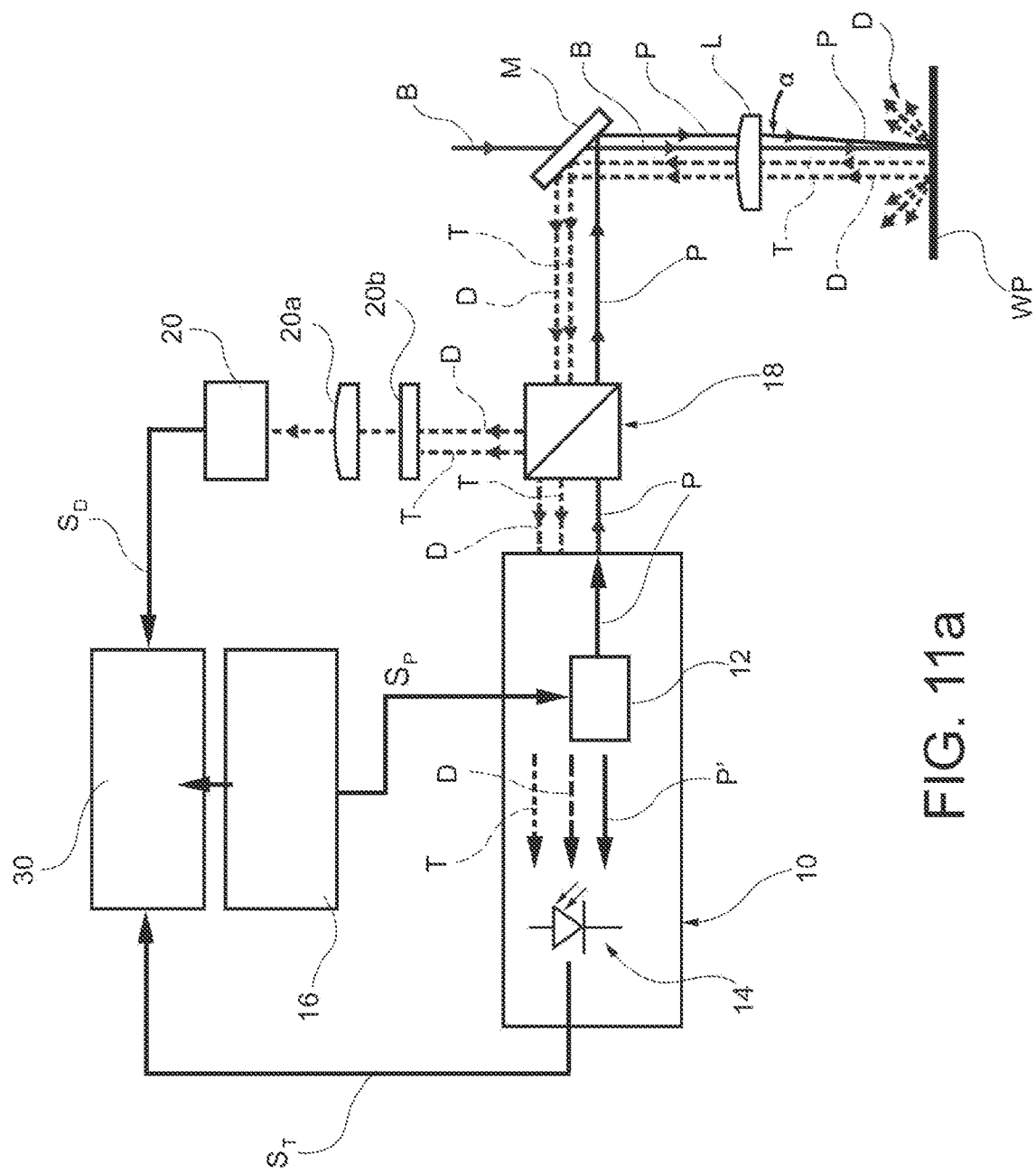
FIGS. 11a and 11b show a diagram of the distance measurement by triangulation applied to a laser manufacturing process.

With reference to FIG. 10, a plurality of focused probe radiation beams P1-P8 is shown, arranged symmetrically inclined with respect to the common propagation axis Z, respectively according to a side view in the top figure and in cross section in the bottom figure. The use of multiple beams arranged symmetrically about the propagation axis along which the measurement takes place, or symmetrically with respect to this axis, is particularly advantageous since it allows a measurement of the isotropic distance independent of the direction of measurement. An isotropic beam configuration is expedient in applications on laser processing machines wherein the probe radiation may be used coaxially to the propagation axis of the processing laser beam, obtaining a distance measurement that does not depend on preferential directions and is free of blind areas.

Finally, with reference to FIGS. 11*a* and 11*b* an almost coaxial triangulation configuration is shown. Elements common to FIG. 2 are indicated with the same numerical references. FIG. 11*a* shows a view of the triangulation system wherein the probe radiation is focused on the workpiece, while in FIG. 11*b* a simplified diagram is shown wherein the workpiece is set back with respect to the focusing plane. The detectors 20 are shown in the form of a video camera in front of which a focusing lens 20*a* is arranged, downstream of a band-pass filter 20*b* adapted to transmit the wavelength or wavelength range of the scattered probe radiation. The path of the probe radiation P and the scattered probe radiation D is aligned with the path of the processing laser beam B through a dichroic mirror M, and a focusing lens L is arranged to focus the beams on the workpiece WP.

FIG. 11*b* shows the probe radiation beam P, which, following focusing through the lens L, impinges on the workpiece WP at an angle α. If the distance of the workpiece WP from the focusing plane F is not zero, the inclined beam impinges on the workpiece WP in a position $y_1$ with respect to the axis, which is a function of the distance z of the workpiece along the axis Z, according to the relationship $y_1 = f(z)$. The relevant scattered probe radiation D captured by the focusing lens L is conducted to the detectors 20 through the further focusing lens 20*a* and impinges on said detectors at a distance $y_2$ with respect to the axis, which is in turn correlated to the distance z of the workpiece along the Z axis, according to the relationship $y_2 = f(z)$. It is therefore possible to determine the distance z by inverting the relationship, i.e., $z = f^{-1}(y_2)$.

Figure 12:
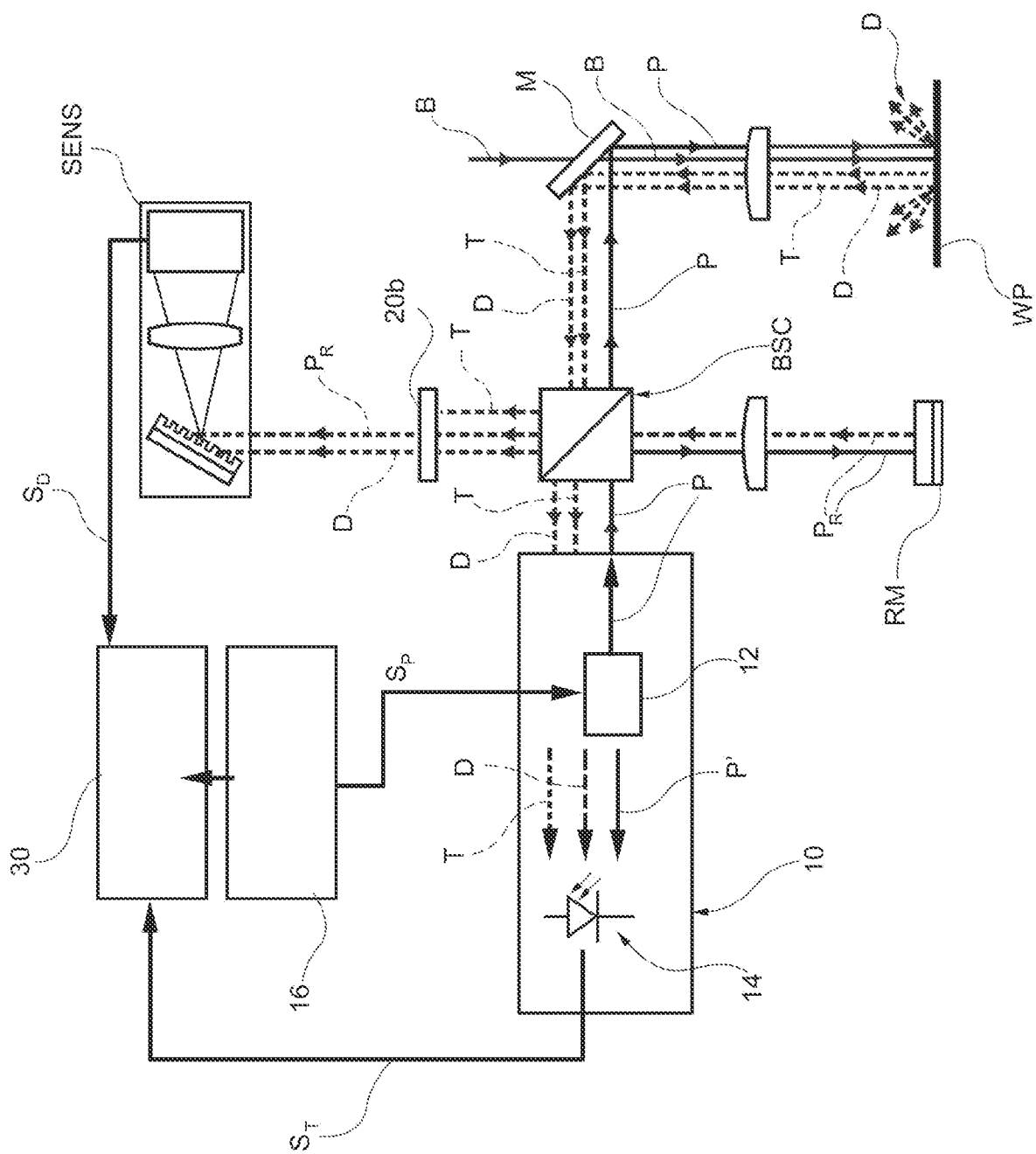
FIG. 12 is a diagram of the distance measurement by low coherence interferometry applied to a laser manufacturing process.

FIG. 12 shows a configuration of the combined optical system of the invention used in the application of interferometric techniques for determining the distance of the workpiece WP from the source of the probe radiation. Elements common to FIG. 2 are indicated with the same numerical references.

An interferometric configuration makes use of the phenomenon of interference that occurs between coherent or partially coherent radiation beams to measure a distance or in general a difference between optical paths. A typical interferometric configuration comprises two arms, respectively a measurement arm and a reference arm, along which a common optical radiation is directed. The optical radiation beam that travels an optical path of the measuring arm, and is backscattered by the workpiece WP interposed along the measuring arm, and the optical radiation beam that travels an optical path of the reference arm, and is reflected by a fixed mirror, are recombined on a common incidence region of interferometric sensors, where they are superimposed, giving rise to an interference phenomenon that generates a fringe pattern due to constructive or destructive interference respectively, as a function of the difference in optical path between the two arms. The interferometric sensors may be a photodetector or an array of photodetectors such as a linear photodetector array or a two-dimensional photodetector array, possibly combined with a spectrometer or other optical elements according to the specific interferometric technique, which may be an interferometric technique in the time domain, in the frequency domain, or in the space domain. The interferometric sensors are able to detect the interference pattern as a function of the variations (in the space domain, in the frequency domain, or in the time domain) of the geometric length or refractive index of the optical path along the measuring arm, while typically the optical path of the reference arm is constant and referred to nominal operating conditions.

FIG. 12 shows a Michelson interferometric configuration adapted to a low coherence optical interferometric technique in the frequency domain, wherein the information about the comparison between the length of the optical measurement path and the reference optical path is encoded in the space of the wavelengths. Specifically, the optical interferometric technique in the frequency domain is based on the Fourier transform relationship between the spectral density function and the cross-correlation of the measurement and reference beams, by means of which it is possible to extract the differential measurement of distances in real space from the spectral profile of the wavelengths of the two interfering beams. A single spectral acquisition of the superimposed measurement and reference beams is possible using a diffraction grating and a focusing lens downstream of said grating to project the spectral distribution of the interfering beams onto a linear sensor device, for example a video camera. The spectrum of the two interfering beams shows a periodic modulation, and the periodicity (frequency) of this modulation in the wavelength space varies as the difference between the optical lengths of the measurement path and the reference path varies. A Fourier transform calculation algorithm, for example an FFT algorithm, is applied to extract the measurement of the signal intensity peak in relation to the difference between the optical paths in real space. In the figure, P indicates the probe radiation that travels along the optical measurement path, wherein the workpiece WP is interposed, and PR indicates the probe radiation that travels along the reference optical path, wherein a reflection mirror RM is interposed, following the splitting through a dichroic mirror or similar beam splitter/combiner device BSC. The probe radiation D scattered by the workpiece WP and the reference probe radiation PR are recombined at the beam splitter/combiner device BSC and are directed therefrom to the assembly of interferometric sensors, generically indicated with SENS.

The described combined optical system is advantageously associated with a machine for laser processing of a workpiece or material, for example permanently coupled to a working head of the laser processing machine, to determine the distance of the surface of a workpiece with respect to the head and the workpiece temperature during processing and, on the basis of these parameters, to perform a process control. Advantageously, the optical probe radiation may be aligned with the processing laser beam to perform coaxial measurements at the processing area, so as to determine the real separation distance of the surface of a workpiece from the working head and the temperature of the portion of molten material on the workpiece being processed.

Figure 13:
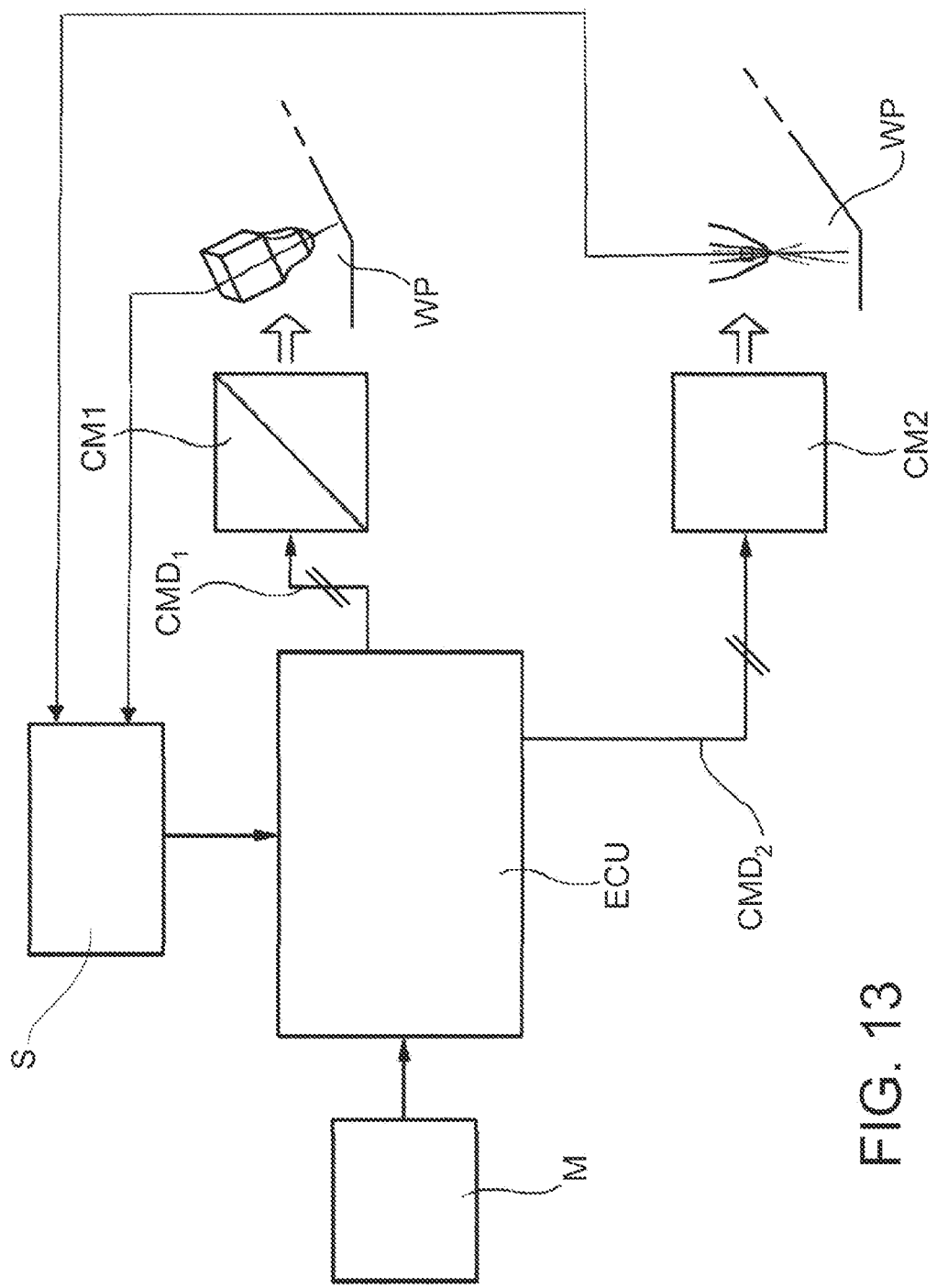
FIG. 13 is a block diagram of an electronic control system of a machine for the laser processing of a workpiece or a material.

FIG. 13 shows a block diagram of an electronic control system of a machine for the laser processing of a workpiece or material.

The system comprises electronic processing and control means indicated in the figure as a whole with ECU, which may be integrated into a single processing unit on board the machine or implemented in distributed form, whereby said processing and control means comprise processing modules located in different parts of the machine, including, for example, the working head.

Memory means M associated with the electronic processing and control means ECU store a predetermined processing model or program, for example comprising a predetermined processing trajectory in the form of instructions for moving the working head and/or the workpiece, and physical processing parameters indicative of the power distribution of the optical beam, power intensity of the beam, and activation times of the laser beam as a function of the processing trajectory.

The electronic processing and control means ECU are arranged to access the memory means M to acquire a processing trajectory and to control the application of the processing laser beam along said trajectory. Controlling the application of the processing laser beam along the predetermined processing trajectory includes controlling the irradiation of a predetermined power distribution of the laser beam toward a predetermined processing area by reference to the predetermined pattern or processing program, i.e., according to the processing trajectory information and processing parameters acquired by the memory means, and, in some applications, controlling the delivery of an assist gas flow.

A combined optical system S of the present invention is arranged on board the machine to detect in real time the distance between the working head and the workpiece, as well as the evolution over time of this distance, by acquiring the scattered probe radiation D, and the surface temperature of the workpiece at the processing area by acquiring the thermally emitted radiation T.

The electronic processing and control means ECU are arranged to receive from the combined optical system S of the invention a signal indicative of the distance, i.e., of the reciprocal position, between the working head and the workpiece over time, and a signal relating to the local temperature on the surface of the workpiece at the processing area.

The electronic processing and control means ECU comprise a first control module CM1 for controlling the mechanical parameters of the processing, arranged to emit first command signals CMD1 toward a known set of actuator means, comprising actuator means for moving the working head along the degrees of freedom allowed thereto by the specific embodiment of the machine and actuating means for moving the material being processed with respect to the position of the working head, adapted to cooperate with the actuating means for moving the working head to present a programmed processing trajectory on the material being processed at the output of the laser beam of the working head, as a function of the determined distance, i.e., the mutual position, between the working head and the workpiece. These actuator means are not described in detail because they are known in the art.

The electronic processing and control means ECU comprise a second control module CM2 for controlling the physical parameters of the processing, arranged to emit second control signals CMD2 toward means for controlling the generation and transmission of the laser beam, for example for controlling the intensity and the transverse power distribution of the laser beam, as a function of the instantaneous processing conditions, i.e., the local temperature of the surface of the workpiece in the area currently being processed.

Advantageously, the closed-loop control of the position of the working head and of the physical parameters of the processing allows for an increase in the precision of the focusing of the processing laser beam in cutting and welding processes, the precision in the height of material deposition in additive manufacturing processes, the frequency or activation duty cycle of a pulsed processing laser beam, the pressure of an assist gas, the speed of translation of the head along a processing (cutting or welding) trajectory, and the flow rate of powdered materials in additive manufacturing processes.

Furthermore, the closed-loop temperature control may be used in particular for thermal stabilization, and thus for the stabilization of the process.

It should be noted that the proposed embodiment of the present is merely exemplifying in nature and not limiting of this invention. Those skilled in the art will easily be able to implement this invention in different embodiments which do not however depart from the principles set forth herein and are therefore encompassed in this patent.

This is particularly true with regard to the possibility of using detectors for the scattered optical probe radiation and for the thermally emitted radiation that are different from the photodetector devices, for example video cameras or spectrometers.

The principle of the invention remaining unchanged, embodiments and details of execution may be modified with respect to those described and illustrated purely by way of non-limiting example, without thereby departing from the scope of protection as described and claimed herein.

What is claimed is:

1. A combined optical system for determining a surface temperature of an object or material subject to laser processing and a distance of said object or material subject to laser processing from a predetermined reference point associated with said combined optical system, wherein the combined optical system comprises:
    an optical radiation source adapted to emit at least one optical probe radiation at a predetermined wavelength or in a predetermined wavelength range, wherein the optical probe radiation is distinct from a processing laser beam;
    a control unit for controlling the optical radiation source, arranged to continuously alternately control switching of said optical radiation source between an operative condition, in which the optical radiation source emits said at least one optical probe radiation, and an inoperative condition, in which the optical radiation source does not emit any optical probe radiation, at a repetitive switching frequency from 1 to 100 KHZ;
    optical detectors adapted to detect at least one scattered optical probe radiation and one optical radiation thermally emitted from the surface of said object or material; and
    a processing unit synchronized with said control unit and arranged for:
        determining the distance of the surface of said object or material from said predetermined reference point on the basis of the optical probe radiation scattered from the surface of said object or material and received by said optical detectors when the optical radiation source is in the operative condition; and
        determining a local temperature of the surface of said object or material on the basis of the optical radiation thermally emitted from the surface of said object or material and received by said optical detectors when the optical radiation source is in the inoperative condition.

2. The combined optical system of claim 1, wherein the optical radiation source is arranged to emit a primary optical probe radiation and a secondary or partial optical radiation representative of said primary optical probe radiation, and said optical detectors comprise at least one monitoring photodetector device normally coupled to said optical radiation source for detecting said secondary or partial optical radiation.

3. The combined optical system of claim 2, wherein the primary optical probe radiation scattered from the surface of said object or material is at least partially superimposed on said secondary or partial optical radiation on a region of common incidence of said at least one monitoring photodetector device,
    wherein said at least one monitoring photodetector device is adapted to detect an interference fringe pattern between the secondary or partial optical radiation and the primary optical probe radiation scattered by the surface of said object or material, and
    wherein the processing unit is arranged to determine the distance of the surface of said object or material from said optical radiation source on the basis of said interference fringe pattern.

4. The combined optical system of claim 2, wherein said optical radiation source comprises a light-emitting diode having a primary radiation emission area and a secondary radiation emission area, and said at least one monitoring photodetector device faces said secondary radiation emission area, and the primary optical probe radiation scattered by the surface of said object or material is at least partially collected by said primary radiation emission area.

5. The combined optical system of claim 4, wherein said control unit is arranged to selectively control activation and deactivation of an excitation current of said light-emitting diode, which is adapted to alter a thermodynamic equilibrium of populations of charge carriers.

6. The combined optical system of claim 1, wherein said optical detectors comprise photodetectors having a spectral detection range comprising said predetermined wavelength of the optical probe radiation scattered by the surface of said object or material and at least one wavelength of the optical radiation thermally emitted from the surface of said object or material.

7. The combined optical system of claim 1, wherein said optical detectors comprise first photodetector devices adapted to intercept at least part of the optical probe radiation scattered by the surface of said object or material and second photodetector devices adapted to intercept at least part of the optical radiation thermally emitted from the surface of said object or material.

8. The combined optical system of claim 7, wherein said first photodetector devices comprise a photodetector arrangement extending along at least one spatial direction and arranged to receive said optical probe radiation scattered by the surface of said object or material from an observation direction at a non-zero angle with respect to an emission direction of the optical probe radiation, and the processing unit is arranged to determine the distance of the surface of said object or material with respect to said optical radiation source on the basis of an incidence position of the optical probe radiation scattered from the surface of said object or material along said at least one spatial direction of the photodetector arrangement.

9. The combined optical system of claim 7, wherein said first photodetector devices comprise a photodetector arrangement extending along at least one spatial direction, said optical radiation source is coupled to a downstream beam-shaping means adapted to shape said at least one optical probe radiation into a beam having a predetermined transverse power distribution variable along a propagation axis, and the processing unit is arranged to determine the distance of the surface of said object or material with respect to said optical radiation source on the basis of the predetermined transverse power distribution of the optical probe radiation scattered by the surface of said object or material and detected by the photodetector arrangement.

10. The combined optical system of claim 7, wherein said first photodetector devices comprise a photodetector arrangement extending along at least one spatial direction, said optical radiation source is adapted to emit a first coaxial optical probe radiation beam and a second coaxial optical probe radiation beam having different transverse power distributions, and the processing unit is arranged to determine the distance of the surface of said object or material with respect to said optical radiation source on the basis of a differential comparison between the transverse power distribution of the first coaxial optical probe radiation beam scattered from the surface of said object or material and the transverse power distribution of the second coaxial optical probe radiation beam scattered from the surface of said object or material, detected by the photodetector arrangement.

11. The combined optical system of claim 10, wherein said first and second coaxial optical probe radiation beams have different polarizations.

12. The combined optical system of claim 11, wherein said first and second coaxial optical probe radiation beams have orthogonal polarizations.

13. The combined optical system of claim 10, wherein said first and second coaxial optical probe radiation beams have different wavelengths.

14. The combined optical system of claim 10, wherein said first and second coaxial optical probe radiation beams are emitted at alternate intervals.

15. The combined optical system of claim 7, wherein said first photodetector devices comprise a photodetector array, said optical radiation source is adapted to emit an optical probe radiation comprising a plurality of beams arranged symmetrically with respect to the propagation axis, and the processing unit is arranged to determine the distance of the surface of said object or material with respect to said optical radiation source on the basis of a comparison between a mutual incidence position of said plurality of beams of the optical probe radiation scattered from the surface of said object or material on the photodetector arrangement.

16. The combined optical system of claim 7, comprising a beam splitter/combiner device adapted to split said optical probe radiation into a first optical probe radiation beam and a second reference optical radiation beam,
the combined optical system comprising a measurement path adapted to conduct said first optical probe radiation beam towards the surface of said object or material and to conduct a beam reflected or scattered from the surface of said object or material toward an interferometric optical sensor, through a measurement optical path,
the combined optical system comprising a reference path adapted to conduct said second reference optical radiation beam towards said interferometric optical sensor through a reference optical path of predetermined optical length, equivalent to the optical length of the measurement optical path in a nominal operative condition in which position of the surface of said object or material is a predetermined nominal position with respect to the predetermined reference point associated with the combined optical system;
wherein said beam splitter-combiner device of the first optical probe radiation beam and second reference optical radiation beam is arranged to superimpose said first optical probe radiation beam and second reference optical radiation beam on a common incidence region of said interferometric optical sensor,
wherein said first photodetector devices comprise an interferometric optical sensor including a photodetector arrangement extending along at least one spatial direction, adapted to detect an interference fringe pattern between the first optical probe radiation beam and the second reference optical radiation beam on said common incidence region, and
wherein the processing unit is arranged to determine the distance of the surface of said object or material from said optical radiation source on the basis of said interference fringe pattern.

17. The combined optical system of claim 7, wherein wavelength filtering means are coupled to an input of said first photodetector devices, said wavelength filtering means being adapted to transmit said predetermined wavelength or said predetermined wavelength range of the optical probe radiation scattered by the surface of said object or material, and to block wavelengths of the optical radiation thermally emitted from the surface of said object or material.

18. The combined optical system of claim 6, wherein said processing unit is also configured to normalize the thermally emitted optical radiation intercepted by said first photodetector devices as a function of the determined distance of the surface of said object or material.

19. A method for determining a temperature of a surface of an object or material subject to laser processing and a distance of said object or material subject to laser processing from a predetermined reference point associated with a combined optical system comprising:
an optical radiation source adapted to emit at least one optical probe radiation at a predetermined wavelength or in a predetermined wavelength range, said optical probe radiation distinct from a processing laser beam;
a control unit for controlling the optical radiation source, arranged to alternately control switching of said optical radiation source between an operative condition, in which the optical radiation source emits said at least one optical probe radiation, and an inoperative condition, in which the optical radiation source does not emit any optical probe radiation;

optical detectors adapted to detect at least one scattered optical probe radiation and one optical radiation thermally emitted from the surface of said object or material; and a processing unit synchronized with said control unit and arranged for:

determining the distance of the surface of said object or material from said predetermined reference point on the basis of the optical probe radiation scattered from the surface of said object or material and received by said optical detectors when the optical radiation source is in the operative condition; and determining a local temperature of the surface of said object or material on the basis of the optical radiation thermally emitted from the surface of said object or material and received by said optical detectors when the optical radiation source is in the inoperative condition, the method comprising:

providing an optical radiation source adapted to emit at least one optical probe radiation at a predetermined wavelength or in a predetermined wavelength range;

continuously in the course of a laser manufacturing process, at a repetitive switching frequency from 1 to 100 kHz, alternately controlling switching of said optical radiation source between an operative condition, in which the optical radiation source emits said at least one optical probe radiation, to an inoperative condition, in which the optical radiation source does not emit any optical probe radiation according to said repetitive switching frequency;

detecting at least one scattered optical radiation and one optical radiation thermally emitted from the surface of said object or material;

determining the distance of the surface of said object or material from said reference point on the basis of the optical probe radiation scattered by the surface of said object or material, detected when the optical radiation source is in the operative condition; and determining the temperature of the surface of said object or material on the basis of the optical radiation thermally emitted from the surface of said object or material, detected when the optical radiation source is in the inoperative condition.

20. A machine for laser processing of a workpiece or material, operating by a processing laser beam emitted by a working head and conducted along a working trajectory on the workpiece or material comprising a succession of processing areas, and comprising processing parameter control means, wherein the machine comprises a combined optical system according to claim 1, permanently coupled to said working head for determining a temperature of a surface of said workpiece or material and a distance of said workpiece or material from the working head, said processing parameter control means acting on the basis of a predetermined processing design, the determined temperature of the surface of said workpiece or material, and the determined distance of the surface of said workpiece or material with respect to the working head.

21. The machine of claim 20, wherein processing parameters include at least one among intensity and transverse power distribution of the processing laser beam, relative position between said working head and said workpiece or material, height of deposition of material in an additive manufacturing process, frequency or duty cycle of activation of a pulsed processing laser beam, pressure of an assist gas, translation speed of the working head along the working trajectory, and flow rate of powdered materials in additive manufacturing processes.

22. The machine of claim 20, configured such that said optical probe radiation is coaxial with said processing laser beam.

23. The machine of claim 20, configured such that said optical probe radiation and said processing laser beam impinge on a same area of said surface of said workpiece or material.

24. The machine of claim 20, wherein said control unit is arranged to control the optical radiation source such that said at least one optical probe radiation is continuously emitted at said repetitive switching frequency when said processing laser beam is turned off in the course of a laser manufacturing process.

\* \* \* \* \*